United States Patent
Zhang et al.

(10) Patent No.: US 10,485,003 B2
(45) Date of Patent: Nov. 19, 2019

(54) METHOD, APPARATUS AND COMPUTER PROGRAM PRODUCT FOR DETERMINING TRANSMISSION PARAMETERS

(71) Applicant: Nokia Technologies Oy, Espoo (FI)

(72) Inventors: Yuantao Zhang, Beijing (CN); Rapeepat Ratasuk, Hoffman Estates, IL (US); Chun Hai Yao, Beijing (CN); Yan Ji Zhang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 50 days.

(21) Appl. No.: 15/570,475

(22) PCT Filed: Apr. 20, 2016

(86) PCT No.: PCT/FI2016/050258
§ 371 (c)(1),
(2) Date: Oct. 30, 2017

(87) PCT Pub. No.: WO2016/181031
PCT Pub. Date: Nov. 17, 2016

(65) Prior Publication Data
US 2019/0254038 A1    Aug. 15, 2019

Related U.S. Application Data

(60) Provisional application No. 62/161,422, filed on May 14, 2015.

(51) Int. Cl.
*H04W 72/04* (2009.01)
(52) U.S. Cl.
CPC ..... *H04W 72/0493* (2013.01); *H04W 72/042* (2013.01); *H04W 72/044* (2013.01)
(58) Field of Classification Search
CPC ........... H04W 72/0493; H04W 72/042; H04W 72/044
See application file for complete search history.

(56) References Cited

U.S. PATENT DOCUMENTS

2005/0025254 A1*  2/2005  Awad ............. H04L 1/0003
                                                                        375/295
2014/0185479 A1   7/2014  Lee
(Continued)

FOREIGN PATENT DOCUMENTS

EP          2106057 A1    9/2009
JP          2011517889 A   6/2011

OTHER PUBLICATIONS

Extended European Search Report for corresponding European Patent Application No. 16792247.5, dated Oct. 24, 2018, 11 pages.
(Continued)

*Primary Examiner* — Duc C Ho
(74) *Attorney, Agent, or Firm* — Nokia Technologies Oy

(57) ABSTRACT

Methods, apparatus and computer program products are disclosed for determining transmission parameters in a wireless network. A method comprises: receiving transmission configuration information used by a network element for determining transmission parameters, wherein the transmission configuration information comprises a first set of parameters comprising at least a first repetition level set index, a first repetition level index, a first resource allocation and a first transport block size index, or a second set of parameters comprising at least a second repetition level index, a second resource allocation, and a second transport block size index, or a third set of parameters comprising at least a modulation and coding scheme level index, a third resource allocation and a third transport block size index; determining transmission parameters used by the network element based at least in part on the transmission configuration information.

20 Claims, 5 Drawing Sheets

---

202

Transmitting transmission configuration information used by a network element to a mobile terminal for determining transmission parameters, wherein the transmission configuration information comprises a first set of parameters comprising at least a first repetition level set index, a first repetition level index, a first resource allocation and a first transport block size index, or a second set of parameters comprising at least a second repetition level index, a second resource allocation, and a second transport block size index, or a third set of parameters comprising at least a modulation and coding scheme level index, a third resource allocation and a third transport block size index

(56) References Cited

U.S. PATENT DOCUMENTS

2014/0301356 A1 10/2014 Wang
2016/0262109 A1* 9/2016 Chen ................ H04W 4/70
2016/0338013 A1* 11/2016 Yu .................. H04L 1/0001

OTHER PUBLICATIONS

"DCI Design for Rel.13 MTC", 3GPP TSG-RAN Working Group 1 meeting #80bis, R1-151671, Agenda: 7.2.1.10, Panasonic, Apr. 20-24, 2015, pp. 1-3.
Office action for corresponding Japanese Patent Application No. 2017-559321, dated Nov. 14, 2018, 3 pages of office action and 3 pages of office action translation available.
"DCI Content for MTC", 3GPP TSG RAN WG1 Meeting #80, R1-151208, 3GPP TSG RAN WG1 Meeting #80, R1-151208, Agenda Item: 7.2.1.1, Ericsson, Feb. 9-13, 2015, pp. 1-4.
"EPDCCH Aggregation and Repetition for MTC", 3GPP TSG RAN WG1 Meeting #80bis, R1-151212, Agenda Item: 7.2.1.1, Ericsson, Apr. 20-24, 2015, pp. 1-4.
"3rd Generation Partnership Project; Technical Specification Group Radio Access Network; Evolved Universal Terrestrial Radio Access (E-UTRA); Physical layer procedures(Release 12)", 3GPP TS 36.213, V12.5.0, Mar. 2015, pp. 1-239.
"Broad Claims to Signals & Computer Program Products in EPO", IP Watchdog, Retrieved on Oct. 16, 2017, Webpage available at : http://www.ipwatchdog.com/2012/09/27/broad-claims-to-signals-computer-program-products-in-epo/id=28285/.
International Search Report and Written Opinion for corresponding Patent Cooperation Treaty Application No. PCT/FI2016/050258, dated Jun. 20, 2016, 16 pages.
"Views on Multiple Repetition Levels for PDSCH/PUSCH", 3GPP TSG RAN WG1 Meeting #80bis, R1-152052, Agenda Item: 7.2.1.2, NTT Docomo, Apr. 20-24, 2015, pp. 1-3.
"Coverage Enhancement of PRACH for Low Cost MTC", 3GPP TSG RAN WG1 Meeting #75, R1-135104, Agenda item: 6.2.2.2.2, Intel Corporation, Nov. 11-15, 2013, pp. 1-8.
"SIBI Scheduling for Rel-13 MTC UE", 3GPP TSG RAN WG2 Meeting #89b, R2-151428, Agenda Item: 7.4.2, NEC, Apr. 20-24, 2015, pp. 1-3.
"PDSCH/PUSCH Repetition Level Indication", 3GPP TSG-RAN WG1 Meeting #83, R1-156640, Agenda item: 6.2.1.3, Nokia Networks, Nov. 15-22, 2015, 3 pages.
Office action received for corresponding Japanese Patent Application No. 2017-559321, dated Aug. 5, 2019, 4 pages of office action and 3 page of translation available.

* cited by examiner

202

Transmitting transmission configuration information used by a network element to a mobile terminal for determining transmission parameters, wherein the transmission configuration information comprises a first set of parameters comprising at least a first repetition level set index, a first repetition level index, a first resource allocation and a first transport block size index, or a second set of parameters comprising at least a second repetition level index, a second resource allocation, and a second transport block size index, or a third set of parameters comprising at least a modulation and coding scheme level index, a third resource allocation and a third transport block size index

Figure 2

METHOD, APPARATUS AND COMPUTER PROGRAM PRODUCT FOR DETERMINING TRANSMISSION PARAMETERS

RELATED APPLICATION

This application was originally filed as PCT Application No. PCT/FI2016/050258, filed on Apr. 20, 2016, which claims priority from U.S. Application No. 62/161,422, filed on May 14, 2015.

BACKGROUND

Field

Embodiments of the disclosure generally relate to wireless communications, and, more particularly, to determining transmission parameters in a wireless network.

Description of Related Art

In a wireless network, a network element may in control signaling or in other suitable ways indicate transmission parameters used by the network element to a mobile terminal. For example, in current Long Term Evolution (LTE) system, for unicast transmission, an enhanced Node-B (eNB) would in the downlink control information (DCI) indicate a modulation and coding scheme (MCS) to the scheduled UE. The transmission parameters may include modulation and coding scheme, resource allocations, packet size and so on. The mobile terminal can then receive information transmitted by the network element according to the transmission parameters. The network element may set the same or different transmission parameters for respective packets.

For some kinds of wireless communication, such as LTE machine type communication (MTC), an eNB would allocate one or more (up to 6) Physical resource block (PRB) pairs in a specific 1.4 MHz region in a starting subframe for a physical downlink sharing channel (PDSCH) transmission, and repeat the PDSCH in the following multiple subframes. For a LTE MTC user equipment (UE) in coverage enhanced (CE) mode, the eNB would also allocate a repetition level to the UE, from which the UE knows how many repetitions would be used for the PDSCH transmission. However, till now, how to notify a UE of this transmission parameter (i.e., the repetition level) in connection with other transmission configuration information is still under consideration. Furthermore, in case of transmitting the repetition level to a UE, it may require to redesign other transmission parameters such as transport block size (TBS).

Therefore, it is desirable to provide a flexible solution to notify UEs of this transmission parameter (i.e., the repetition level) in connection with other transmission configuration information to maximize the system performance.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to one aspect of the disclosure, it is provided a method for determining transmission parameters in a wireless network. The method comprises: transmitting transmission configuration information used by a network element to a mobile terminal for determining transmission parameters, wherein the transmission configuration information comprises a first set of parameters comprising at least a first repetition level set index, a first repetition level index, a first resource allocation and a first transport block size index, or a second set of parameters comprising at least a second repetition level index, a second resource allocation, and a second transport block size index, or a third set of parameters comprising at least a modulation and coding scheme level index, a third resource allocation and a third transport block size index.

According to another aspect of the disclosure, it is provided an apparatus for determining transmission parameters in a wireless network. The apparatus comprises: a transmitting means configured to transmit transmission configuration information used by the apparatus to a mobile terminal for determining transmission parameters, wherein the transmission configuration information comprises a first set of parameters comprising at least a first repetition level set index, a first repetition level index, a first resource allocation and a first transport block size index, or a second set of parameters comprising at least a second repetition level index, a second resource allocation, and a second transport block size index, or a third set of parameters comprising at least a modulation and coding scheme level index, a third resource allocation and a third transport block size index.

According to still another aspect of the disclosure, it is provided an apparatus for determining transmission parameters in a wireless network. The apparatus comprises: at least one processor; and at least one memory including computer program code, wherein the at least one memory and the computer program code are configured to, with the at least one processor, cause the apparatus to transmit transmission configuration information used by the apparatus to a mobile terminal for determining transmission parameters, wherein the transmission configuration information comprises a first set of parameters comprising at least a first repetition level set index, a first repetition level index, a first resource allocation and a first transport block size index, or a second set of parameters comprising at least a second repetition level index, a second resource allocation, and a second transport block size index, or a third set of parameters comprising at least a modulation and coding scheme level index, a third resource allocation and a third transport block size index.

According to still another aspect of the present disclosure, it is provided a computer program product comprising at least one non-transitory computer-readable storage medium having computer-executable program instructions stored therein, the computer-executable instructions being configured to, when being executed, cause an apparatus to operate as described above.

According to still another aspect of the disclosure, it is provided a method for determining transmission parameters in a wireless network. The method comprises: receiving transmission configuration information used by a network element for determining transmission parameters, wherein the transmission configuration information comprises a first set of parameters comprising at least a first repetition level set index, a first repetition level index, a first resource allocation and a first transport block size index, or a second set of parameters comprising at least a second repetition level index, a second resource allocation, and a second transport block size index, or a third set of parameters comprising at least a modulation and coding scheme level index, a third resource allocation and a third transport block size index; and determining transmission parameters used by the network element based at least in part on the transmission configuration information.

According to still another aspect of the disclosure, it is provided an apparatus for determining transmission parameters in a wireless network. The apparatus comprises: a receiving means configured to receive transmission configuration information used by a network element for determining transmission parameters, wherein the transmission configuration information comprises a first set of parameters comprising at least a first repetition level set index, a first repetition level index, a first resource allocation and a first transport block size index, or a second set of parameters comprising at least a second repetition level index, a second resource allocation, and a second transport block size index, or a third set of parameters comprising at least a modulation and coding scheme level index, a third resource allocation and a third transport block size index; and a determining means configured to determine transmission parameters used by the network element based at least in part on the transmission configuration information.

According to still another aspect of the disclosure, it is provided an apparatus for determining transmission parameters in a wireless network. The apparatus comprises: at least one processor; and at least one memory including computer program code, wherein the at least one memory and the computer program code are configured to, with the at least one processor, cause the apparatus to receive transmission configuration information used by a network element for determining transmission parameters, wherein the transmission configuration information comprises a first set of parameters comprising at least a first repetition level set index, a first repetition level index, a first resource allocation and a first transport block size index, or a second set of parameters comprising at least a second repetition level index, a second resource allocation, and a second transport block size index, or a third set of parameters comprising at least a modulation and coding scheme level index, a third resource allocation and a third transport block size index; and determine transmission parameters used by the network element based at least in part on the transmission configuration information.

According to still another aspect of the present disclosure, it is provided a computer program product comprising at least one non-transitory computer-readable storage medium having computer-executable program instructions stored therein, the computer-executable instructions being configured to, when being executed, cause an apparatus to operate as described above.

These and other objects, features and advantages of the disclosure will become apparent from the following detailed description of illustrative embodiments, which are to be read in connection with the accompanying drawings.

BRIEF DESCRIPTION OF THE DRAWINGS

FIG. 2 is a diagram depicting the process of transmitting transmission configuration information in a wireless network according to an embodiment;

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Figure 1:
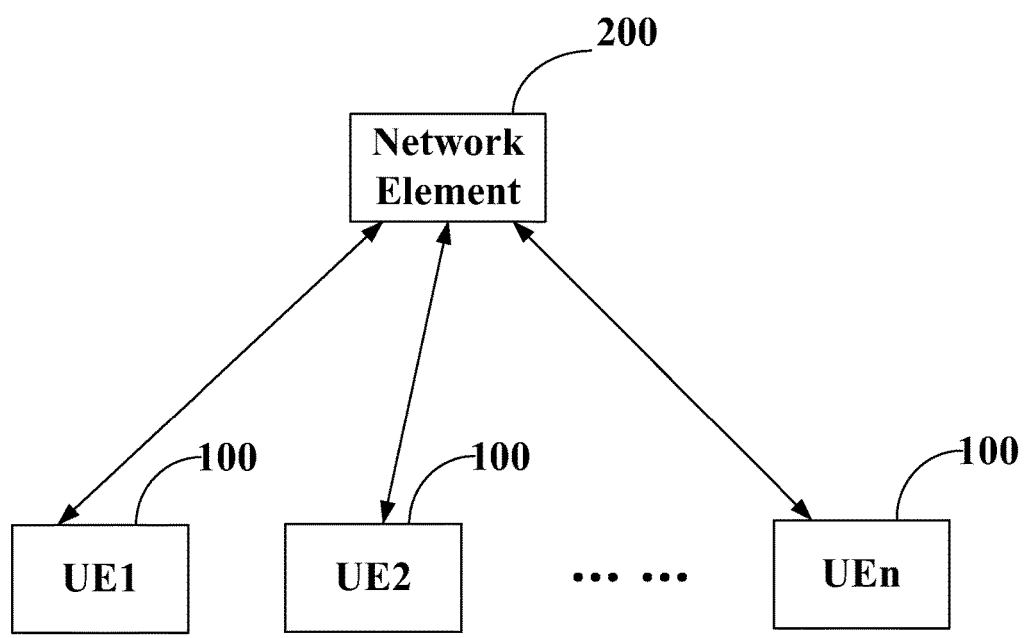
FIG. 1 is a simplified block diagram illustrating a wireless system according to an embodiment.

FIG. 1 shows a wireless system according to an embodiment. While this and other embodiments below are primarily discussed in the context of a LTE system for machine type communication (MTC), it will be recognized by those of ordinary skill that the disclosure is not so limited. In fact, the various aspects of this disclosure are useful in any wireless network that can benefit from the determination of transmission parameters as is described herein, such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma1000, etc. UTRA includes Wideband CDMA (WCDMA) and other variants of CDMA. CDMA1000 covers IS-1000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, etc.

As shown in FIG. 1, the wireless system comprises a network element 200 such as an eNB and a plurality of UEs (mobile terminals) 100 such as LTE MTC UEs. The network element 200 refers to function elements on the network side as compared to the mobile terminals. For example, the network element 200 may comprise an eNB. The solid lines with double arrows indicate desired transmissions between the mobile terminals and the network element on the downlink and uplink. It is well known that a cellular radio system comprises a network of radio cells each served by a transmitting station, known as a cell site or base transceiver station. The radio network provides wireless communications service for a plurality of transceivers (in most cases mobile). The network of network elements working in collaboration allows for wireless service which is greater than the radio coverage provided by a single network element. The individual network element is connected by another network (in many cases a wired network, not shown), which includes additional controllers for resource management and in some cases access to other network systems (such as the Internet) or MANs.

As used herein, the terms "user equipment" and "mobile terminal" are interchangeably used and include, but not limited to, cellular telephones, smartphones, and computers, whether desktop, laptop, or otherwise, as well as mobile devices or terminals such as LTE MTC UEs, MTC devices, handheld computers, PDAs, video cameras, set-top boxes, personal media devices, or any combinations of the foregoing. Further, the term "wireless" means any wireless signal, data, communication, or other interface including without limitation 4G (e.g., LTE, LTE-A), Wi-Fi, Bluetooth, 3G (e.g., 3GPP, 3GPP2, and UMTS), HSDPA/HSUPA, TDMA, CDMA (e.g., IS-95A, WCDMA, etc.), FHSS, DSSS, GSM, PAN/802.15, WiMAX (802.16), 802.20, narrowband/

FDMA, OFDM, PCS/DCS, analog cellular, CDPD, satellite systems, millimeter wave or microwave systems, acoustic, and infrared (i.e., IrDA).

The 3$^{rd}$ generation project partner (3GPP) has approved a new Rel.13 work item of further LTE physical layer enhancements for MTC. A Rel.13 MTC UE only needs to support 1.4 MHz (i.e., only 6PRB pairs) RF bandwidth in downlink and uplink within any system bandwidth. Rel.13 MTC study targets to specify techniques that can achieve 15 dB coverage improvement for FDD, for the use cases where MTC devices are deployed in challenging locations, e.g., deep inside buildings. These techniques may include but not limited to e.g., subframe bundling techniques with hybrid automatic repeat request (HARQ) for physical data channels, resource allocation using enhanced physical downlink control channel (EPDCCH) with cross-subframe scheduling with repetition and so on. The amount of coverage enhancement should be configured per cell and/or per UE and/or per channel and/or group of channels. Rel.13 MTC study also targets to provide power consumption reduction schemes, both in normal coverage and enhanced coverage, to target ultra-long battery life.

In current LTE system, for unicast transmission, eNB would in the DCI indicate an MCS index to the scheduled UE. There are totally 32 MCS entries defined, as shown in table.1, according to LTE TS 36.213, which is incorporated here in its entirety by reference. One MCS index would be selected from this table according to the channel quality observed by the UE. There is one column in the table as "TBS index", indicating the TBS index for the allocated MCS index for a specific resource allocation. The TBS for each MCS index and for each resource allocation (<=6PRB pair resource allocation) is given in table.2 according to LTE TS 36.213. In short, once an eNB allocates a MCS index and a resource allocation in the scheduling DCI, a TBS is determined accordingly. The eNB does not need to indicate the TBS in the scheduling DCI.

TABLE.1

| MCS Index $I_{MCS}$ | Modulation Order $Q_m$ | TBS Index $I'_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |

TABLE.1-continued

| MCS Index $I_{MCS}$ | Modulation Order $Q_m$ | TBS Index $I'_{TBS}$ |
|---|---|---|
| 29 | 2 | reserved |
| 30 | 4 | |
| 31 | 6 | |

TABLE 2

| $I'_{TBS}$ | $N_{PRB}$ | | | | | |
|---|---|---|---|---|---|---|
| | 1 | 2 | 3 | 4 | 5 | 6 |
| 0 | 16 | 32 | 56 | 88 | 120 | 152 |
| 1 | 24 | 56 | 88 | 144 | 176 | 208 |
| 2 | 32 | 72 | 144 | 176 | 208 | 256 |
| 3 | 40 | 104 | 176 | 208 | 256 | 328 |
| 4 | 56 | 120 | 208 | 256 | 328 | 408 |
| 5 | 72 | 144 | 224 | 328 | 424 | 504 |
| 6 | 328 | 176 | 256 | 392 | 504 | 600 |
| 7 | 104 | 224 | 328 | 472 | 584 | 712 |
| 8 | 120 | 256 | 392 | 536 | 680 | 808 |
| 9 | 136 | 296 | 456 | 616 | 776 | 936 |
| 10 | 144 | 328 | 504 | 680 | 872 | 1032 |
| 11 | 176 | 376 | 584 | 776 | 1000 | 1192 |
| 12 | 208 | 440 | 680 | 904 | 1128 | 1352 |
| 13 | 224 | 488 | 744 | 1000 | 1256 | 1544 |
| 14 | 256 | 552 | 840 | 1128 | 1416 | 1736 |
| 15 | 280 | 600 | 904 | 1224 | 1544 | 1800 |
| 16 | 328 | 632 | 968 | 1288 | 1608 | 1928 |
| 17 | 336 | 696 | 1064 | 1416 | 1800 | 2152 |
| 18 | 376 | 776 | 1160 | 1544 | 1992 | 2344 |
| 19 | 408 | 840 | 1288 | 1736 | 2152 | 2600 |
| 20 | 440 | 904 | 1384 | 1864 | 2344 | 2792 |
| 21 | 488 | 1000 | 1480 | 1992 | 2472 | 2984 |
| 22 | 520 | 1064 | 1608 | 2152 | 2664 | 3240 |
| 23 | 552 | 1128 | 1736 | 2280 | 2856 | 3496 |
| 24 | 584 | 1192 | 1800 | 2408 | 2984 | 3624 |
| 25 | 616 | 1256 | 1864 | 2536 | 3112 | 3752 |
| 26 | 712 | 1480 | 2216 | 2984 | 3752 | 4392 |

As described above, for LTE MTC UEs in coverage enhanced (CE) mode, an eNB would allocate one or more (up to 6) PRB pairs in a specific 1.4 MHz region in a starting subframe for PDSCH transmission, and repeat PDSCH in the following multiple subframes. The eNB would also allocate a repetition level to UE, from which UE knows how many repetitions would be used for the PDSCH transmission. In current standard, an eNB does not need to signal TBS to the scheduled UE. The TBS is implicitly decided by the allocated MCS index and the allocated physical resources. However for CE mode UEs, since time domain repetition may be used for data transmission, the total amount of resources would be decided by the allocated resource in each single repeated subframe and the total number of repetitions. Thus it is not suitable to rely on the legacy scheme to decide the TBS. Furthermore, how to notify a mobile terminal of this transmission parameter (i.e., repetition level) in connection with other transmission configuration information is still under consideration by the RAN1.

To solve the above mentioned issues, the present application provides three option1-3. In the following, for the purpose of illustration and exemplify, the option1 and option2 will be described by means of new TBS tables and a number of repetitions table. Furthermore, option3 may also be described by means of the number of repetitions table. However, it is noted that these tables can also be represented by any other suitable data forms and/or data structures and/or datasets. The present application has no limit on it.

In option1, option2 and option3, they introduce the number of repetitions table which may be defined by repetition level set indexes and repetition level indexes. In this table, there may be multiple repetition level set indexes and multiple repetition level indexes, wherein a repetition level index may indicate a repetition level such as 1, 2 or 3 or other suitable level, and a repetition level set index may indicate a set of number of repetitions corresponding to respective repetition levels. In other words, this table may be defined by two-dimensional elements which can provide a more flexible definition of the number of repetitions. One example of the number of repetitions table is shown in Table.3.

TABLE.3

| | $N_{rep\_level}$ | | |
|---|---|---|---|
| $I_{rep\_level\_set}$ | 1 | 2 | 3 |
| 0 | R01 | R02 | R03 |
| 1 | R11 | R12 | R13 |
| 2 | R21 | R22 | R23 |
| 3 | R31 | R32 | R33 | where $I_{rep\_level\_set}$ is a repetition level set index; $N_{rep\_level}$ indicates a repetition level index; Rxz indicates a number of repetitions for $I_{rep\_level\_set}$=x and $N_{rep\_level}$=z. As an example, a set of {R01, R02, R03} is that of number of repetitions for $I_{rep\_level\_set}$=0 $I_{rep\_level\_set}$=0, a set of {R11, R12, R13} is that of number of repetitions for $I_{rep\_level\_set}$=1, a set of {R21, R22, R23} is that of number of repetitions for $I_{rep\_level\_set}$=2, a set of {R31, R32, R33} is that of number of repetitions for $I_{rep\_level\_set}$=3.

According to an embodiment, for example in option1, an eNB may configure and signal a repetition level set index and a repetition level index to a UE. The configuration could be through broadcasting signal or UE specific RRC signaling or physical layer signaling. Once UE got the repetition level set index and the repetition level index, it would know the number of repetitions for its transmission such as PDSCH, according to Table.3.

By way of example, if the eNB may configure and signal a repetition level set index 2 and a repetition level index 3 to the UE, then the UE would know the number of repetitions would be R23 according to Table.3. In practice, which TBS index would be configured may be based on implementation, for example based on UE traffic type.

In option1, it further introduces a new TB S table which is defined by repetition level set indexes, resource allocations and transport block size indexes. The new TBS table may be used for a UE to get a TBS for data transmission if an eNB has notified the UE of a repetition level set index, a resource allocation and a transport block size index.

An example of new TBS table in option1 is shown in Table 4,

| | $N_{PRB}$ | | | | | | |
|---|---|---|---|---|---|---|---|
| $I'_{rep\_level\_set}$ | 1 | 2 | 3 | 4 | 5 | 6 | $I_{TBS}$ |
| 0 | T010 | T020 | T030 | T040 | T050 | T060 | 0 |
| | T110 | T120 | T130 | T140 | T150 | T160 | 1 |
| | T210 | T220 | T230 | T240 | T250 | T260 | 2 |
| | T310 | T320 | T330 | T340 | T350 | T360 | 3 |
| | T410 | T420 | T430 | T440 | T450 | T460 | 4 |
| | T510 | T520 | T530 | T540 | T550 | T560 | 5 |
| | T610 | T620 | T630 | T640 | T650 | T660 | 6 |
| | T710 | T720 | T730 | T740 | T750 | T760 | 7 |
| 1 | T011 | T021 | T031 | T041 | T051 | T061 | 0 |
| | T111 | T121 | T131 | T141 | T151 | T161 | 1 |
| | T211 | T221 | T231 | T241 | T251 | T261 | 2 |
| | T311 | T321 | T331 | T341 | T351 | T361 | 3 |
| | T411 | T421 | T431 | T441 | T451 | T461 | 4 |
| | T511 | T521 | T531 | T541 | T551 | T561 | 5 |
| | T611 | T621 | T631 | T641 | T651 | T661 | 6 |
| | T711 | T721 | T731 | T741 | T751 | T761 | 7 |
| 2 | T012 | T022 | T032 | T042 | T052 | T062 | 0 |
| | T112 | T122 | T132 | T142 | T152 | T162 | 1 |
| | T212 | T222 | T232 | T242 | T252 | T262 | 2 |
| | T312 | T322 | T332 | T342 | T352 | T362 | 3 |
| | T412 | T422 | T432 | T442 | T452 | T462 | 4 |
| | T512 | T522 | T532 | T542 | T552 | T562 | 5 |
| | T612 | T622 | T632 | T642 | T652 | T662 | 6 |
| | T712 | T722 | T732 | T742 | T752 | T762 | 7 |
| 3 | T013 | T023 | T033 | T043 | T053 | T063 | 0 |
| | T113 | T123 | T133 | T143 | T153 | T163 | 1 |
| | T213 | T223 | T233 | T243 | T253 | T263 | 2 |
| | T313 | T323 | T333 | T343 | T353 | T363 | 3 |
| | T413 | T423 | T433 | T443 | T453 | T463 | 4 |
| | T513 | T523 | T533 | T543 | T553 | T563 | 5 |
| | T613 | T623 | T633 | T643 | T653 | T663 | 6 |
| | T713 | T723 | T733 | T743 | T753 | T763 | 7 | where $I'_{rep\_level\_set}$ is a repetition level set index, $I_{TBS}$ is a TBS index of the new TBS table; $N_{PRB}$ indicates a possible resource allocation; $T_{\alpha yx}$ means a TBS for $I_{TBS}$=α, $N_{PRB}$=y, $I'_{rep\_level\_set}$=x; one repetition level set index may correspond to two or more transport block size indexes. For example, $I'_{rep\_level\_set}$=1 corresponds to a set of transport block size indexes 0-7.

It is noted that transport block size indexes in Table.4 may be repeated. In this case, a transport block size may be determined based at least in part on the repetition level set index, the resource allocation and the transport block size index.

According to an embodiment, if an eNB has notified a UE of a repetition level set index, a resource allocation and a transport block size index, then the UE will determine a transport block size based at least in part on the repetition level set index, the resource allocation and the transport block size index, such as according to Table.4. For example, $T_{010}$ may be determined by $I_{TBS}$=0, $N_{PRB}$=1, $I'_{rep\_level\_set}$=0.

For option1, for a given resource allocation, the TBSes for a given repetition level set index may be ascending order, and in other embodiments it may be any other suitable order such as descending order.

In the following, it gives one detailed example for option1 according to an embodiment. Table.5 shows an example TBS sub-table for $I'_{rep\_level\_set}$=0 as below.

TABLE 5

| | $N_{PRB}$ | | | | | |
|---|---|---|---|---|---|---|
| $I_{TBS}$ | 1 | 2 | 3 | 4 | 5 | 6 |
| 0 | 16 | 16 | 16 | 16 | 16 | 16 |
| 1 | 16 | 16 | 16 | 16 | 16 | 32 |
| 2 | 16 | 16 | 16 | 16 | 32 | 56 |
| 3 | 16 | 16 | 16 | 32 | 56 | 88 |
| 4 | 16 | 16 | 32 | 56 | 88 | 120 |
| 5 | 16 | 32 | 56 | 88 | 120 | 152 |
| 6 | 24 | 56 | 88 | 144 | 176 | 208 |
| 7 | 32 | 72 | 144 | 176 | 208 | 256 |

Table.6 shows an example TBS sub-table for I'$_{rep\_level\_set}$=1 as below.

TABLE 6

| | $N_{PRB}$ | | | | | |
|---|---|---|---|---|---|---|
| $I_{TBS}$ | 1 | 2 | 3 | 4 | 5 | 6 |
| 0 | 16 | 16 | 72 | 104 | 144 | 176 |
| 1 | 16 | 32 | 88 | 120 | 176 | 208 |
| 2 | 16 | 56 | 104 | 144 | 208 | 224 |
| 3 | 16 | 72 | 120 | 176 | 224 | 256 |
| 4 | 16 | 88 | 144 | 208 | 256 | 328 |
| 5 | 32 | 104 | 176 | 224 | 328 | 408 |
| 6 | 56 | 120 | 208 | 256 | 408 | 424 |
| 7 | 72 | 144 | 224 | 328 | 424 | 504 |

Table.7 shows an example TBS sub-table for I'$_{rep\_level\_set}$=2 as below.

TABLE 7

| | $N_{PRB}$ | | | | | |
|---|---|---|---|---|---|---|
| $I_{TBS}$ | 1 | 2 | 3 | 4 | 5 | 6 |
| 0 | 16 | 104 | 176 | 224 | 408 | 504 |
| 1 | 32 | 120 | 208 | 256 | 424 | 600 |
| 2 | 56 | 144 | 224 | 328 | 504 | 712 |
| 3 | 72 | 176 | 256 | 408 | 600 | 776 |
| 4 | 88 | 208 | 328 | 424 | 712 | 840 |
| 5 | 104 | 224 | 408 | 504 | 776 | 872 |
| 6 | 120 | 256 | 424 | 600 | 840 | 936 |
| 7 | 144 | 328 | 504 | 680 | 872 | 1032 |

In this embodiment, it should be noted that for one specific resource allocation in such TBS sub-tables, having same repetition level for lower TBS with higher TBS will not cause much resource wastage, since the encoding gain of lower TB S is lower than that for higher TBS.

In another embodiment, the transport block size indexes are not repeated. This case corresponds to option2. In option2, it is also introduces a new TBS table which is defined by repetition level set indexes, resource allocations and transport block size indexes. The TBS table in option2 is similar to that in option1 except that the transport block size indexes in the TB S table of option2 are not repeated.

This TBS table may be used for a UE to get a TBS for data transmission if an eNB has notified the UE of a resource allocation and a transport block size index. In the other side, it may be used for a UE to deduce a repetition level set index which will be described in more detail in the following.

An example of new TBS table in option2 is shown in Table.8.

TABLE 8

| I''$_{rep\_level\_set}$ | $N''_{PRB}$ | | | | | | I''$_{TBS}$ |
| | 1 | 2 | 3 | 4 | 5 | 6 | |
|---|---|---|---|---|---|---|---|
| 0 | T010 | T020 | T030 | T040 | T050 | T060 | 0 |
| | T110 | T120 | T130 | T140 | T150 | T160 | 1 |
| | T210 | T220 | T230 | T240 | T250 | T260 | 2 |
| | T310 | T320 | T330 | T340 | T350 | T360 | 3 |
| | T410 | T420 | T430 | T440 | T450 | T460 | 4 |
| | T510 | T520 | T530 | T540 | T550 | T560 | 5 |
| | T610 | T620 | T630 | T640 | T650 | T660 | 6 |
| | T710 | T720 | T730 | T740 | T750 | T760 | 7 |
| 1 | T811 | T821 | T831 | T841 | T851 | T861 | 8 |
| | T911 | T921 | T931 | T941 | T951 | T961 | 9 |
| | T1011 | T1021 | T1031 | T1041 | T1051 | T1061 | 10 |

TABLE 8-continued

| I''$_{rep\_level\_set}$ | $N''_{PRB}$ | | | | | | I''$_{TBS}$ |
| | 1 | 2 | 3 | 4 | 5 | 6 | |
|---|---|---|---|---|---|---|---|
| | T1111 | T1121 | T1131 | T1141 | T1151 | T1161 | 11 |
| | T1211 | T1221 | T1231 | T1241 | T1251 | T1261 | 12 |
| | T1311 | T1321 | T1331 | T1341 | T1351 | T1361 | 13 |
| | T1411 | T1421 | T1431 | T1441 | T1451 | T1461 | 14 |
| | T1511 | T1521 | T1531 | T1541 | T1551 | T1561 | 15 |
| 2 | T1612 | T1622 | T1632 | T1642 | T1652 | T1662 | 16 |
| | T1712 | T1722 | T1732 | T1742 | T1752 | T1762 | 17 |
| | T1812 | T1822 | T1832 | T1842 | T1852 | T1862 | 18 |
| | T1912 | T1922 | T1932 | T1942 | T1952 | T1962 | 19 |
| | T2012 | T2022 | T2032 | T2042 | T2052 | T2062 | 20 |
| | T2112 | T2122 | T2132 | T2142 | T2152 | T2162 | 21 |
| | T2212 | T2222 | T2232 | T2242 | T2252 | T2262 | 22 |
| | T2312 | T2322 | T2332 | T2342 | T2352 | T2362 | 23 |
| 3 | T2413 | T2423 | T2433 | T2443 | T2453 | T2463 | 24 |
| | T2513 | T2523 | T2533 | T2543 | T2553 | T2563 | 25 |
| | T2613 | T2623 | T2633 | T2643 | T2653 | T2663 | 26 |
| | T2713 | T2723 | T2733 | T2743 | T2753 | T2763 | 27 |
| | T2813 | T2823 | T2833 | T2843 | T2853 | T2863 | 28 |
| | T2913 | T2923 | T2933 | T2943 | T2953 | T2963 | 29 |
| | T3013 | T3023 | T3033 | T3043 | T3053 | T3063 | 30 |
| | T3113 | T3123 | T3133 | T3143 | T3153 | T3163 | 31 | where, I''$_{TBS}$, I''$_{rep\_level\_set}$, N''$_{PRB}$ and $T_{\alpha yx}$ are similar to that in Table.4 of option1. Similar to Table.4 of option1, one repetition level set index may also correspond to two or more transport block size indexes, but in option2, respective repetition level set indexes correspond to respective sets of transport block size indexes which are disjoint from each other. For example, in Table.4 of option1, all the I'$_{rep\_level\_set}$ may correspond to the same set of transport block size indexes, such as {0,1,2,3,4,5,6,7}, while in Table.8 of option2, I''$_{rep\_level\_set}$=1 may correspond to a set of transport block size indexes such as {0,1,2,3,4,5,6,7}, I''rep_level_set=2 may correspond to a set of transport block size indexes such as {8,9,10,11,12,13,14,15} and so on, and these sets are disjoint sets. Therefore, the sets of second transport block size indexes can be used to deduce the repetition level set index which will be described in more detail in the following.

According to an embodiment, a repetition level set index is determined based at least in part on respective sets of transport block size indexes and a transport block size index. Using Table.8 as an example, if an eNB has notified a UE of a transport block size index such as I''$_{TBS}$=6, then the UE will get a repetition level set index such as I''$_{rep\_level\_set}$=0 according to Table.8 since I''$_{TBS}$=6 belongs to the set of {0,1,2,3,4,5,6,7} which may correspond to I''$_{rep\_level\_set}$=0. In this embodiment, if the eNB also has notified the UE of a repetition level index, then the UE may determine a number of repetitions based at least in part on the repetition level set index and the repetition level index, for example according to Table.3.

In an embodiment, an eNB may notify a UE of a resource allocation and a transport block size index, and the UE may determine a transport block size based at least in part on the resource allocation and the transport block size index, for example according to Table.8. As an example, if the eNB has notified the UE of a resource allocation such as N''$_{PRB}$=6 and a transport block size index such as I''$_{TBS}$=6, then the UE may determine a transport block size such as T660 for example by querying Table.8.

For opition2, for a given resource allocation, the TBSes for a repetition level set index may be ascending order, and in other embodiments it may be any other suitable order.

Next we will describe option3. As described above, like option1 and option2, option3 may also use Table.3 to determine a number of repetitions.

In addition, option3 may introduce multiple MCS levels whose respective indexes may correspond to respective repetition level set indexes. Furthermore, a MCS level index can indicate other information, such as code rate, a modulation order such as QPSK etc.

In an embodiment, a repetition level set index is determined based at least in part on a modulation and coding scheme level index. For example, if an eNB has transmitted a modulation and coding scheme level index to a UE, the UE can determine the repetition level set index based on the mapping between the modulation and coding scheme level index and the repetition level set index. Moreover, the mapping of the MCS level index to the repetition level set index may be predefined Furthermore, in option3, it may define a TBS table which contains a plurality of TBSes. The TBS table can be defined by resource allocations and transport block size indexes. For example, an example of TBS table used in option3 is shown in Table.9

TABLE 9

| $I'''_{TBS}$ | $N'''_{PRB}$ | | | | | | $N_{rep\_level}$ |
|---|---|---|---|---|---|---|---|
| | 1 | 2 | 3 | 4 | 5 | 6 | |
| 0 | K01 | K02 | K03 | K04 | K05 | K06 | 1 |
| 1 | K11 | K12 | K13 | K14 | K15 | K16 | |
| 2 | K21 | K22 | K23 | K24 | K25 | K26 | |
| 3 | K31 | K32 | K33 | K34 | K35 | K36 | |
| 4 | K41 | K42 | K43 | K44 | K45 | K46 | |
| 5 | K51 | K52 | K53 | K54 | K55 | K56 | |
| 6 | K61 | K62 | K63 | K64 | K65 | K66 | 2 |
| 7 | K71 | K72 | K73 | K74 | K75 | K76 | |
| 8 | K81 | K82 | K83 | K84 | K85 | K86 | |
| 9 | K91 | K92 | K93 | K94 | K95 | K96 | |
| 10 | K101 | K102 | K103 | K104 | K105 | K106 | |
| 11 | K111 | K112 | K113 | K114 | K115 | K116 | 3 |
| 12 | K121 | K122 | K123 | K124 | K125 | K126 | |
| 13 | K131 | K132 | K133 | K134 | K135 | K136 | |
| 14 | K141 | K142 | K143 | K144 | K145 | K146 | |
| 15 | K151 | K152 | K153 | K154 | K155 | K156 | | where $I'''_{TBS}$ indicates a transport block size index, $N'''_{PRB}$ indicates a resource allocation and Kxy is a TBS for $I'''_{TBS}=x$ and $N'''_{PRB}=y$.

In an embodiment, a transport block size may be determined based at least in part on a third resource allocation and a transport block size index. For example, if an eNB has transmitted the resource allocation and the third transport block size index to a UE, the UE can determine the transport block size for example by querying Table.9 by using the resource allocation and the transport block size index.

In an embodiment, respective repetition level indexes such as in Table.3 correspond to respective transport block size ranges which are disjoint. As an example, in the case of three repetition level indexes, a repetition level index 1 may correspond to the values range from minimum TBS=16 to maximum TBS=328; a repetition level index 2 may correspond to the values range from minimum TBS=329 to maximum TBS=600; and a repetition level index 3 may correspond to the values range from minimum TBS=601 to maximum TBS=1032. In this case, the respective transport block size ranges for the repetition level index 1-3 are disjoint.

According to an embodiment, a repetition level index is determined based at least in part on a transport block size and respective transport block size ranges. As described above, respective repetition level indexes may correspond to respective TBS ranges which are disjoint. Thus if a UE has got a TBS, then it can compare the TBS with the respective TBS ranges to determine that the TBS belongs to which TBS range. After obtaining this information, it can determine the repetition level index corresponding to the determined TBS range.

According to an embodiment, in option3, a number of repetitions may be determined based at least in part on a repetition level set index and a repetition level index. For example, if an UE has obtained the repetition level set index and the repetition level index, then it can determine the number of repetitions based at least in part on the repetition level set index and the repetition level index for example according to Table.3.

According to various embodiments, it is noted that the values and/or values range and/or the number of various parameters, such as the modulation and coding scheme level index, the resource allocation, the transport block size table index, the repetition level set index and the repetition level index and so on, are only illustrative, and in other embodiment, each of which can use any other suitable values and/or values range and/or quantity. The present application has no limit on it.

FIG. 2 is a diagram depicting the process of transmitting transmission configuration information used by a network element to a mobile terminal for determining transmission parameters, according to an embodiment. This process can be implemented in a network element 200 or other entity. The transmission parameters may include at least a TBS and/or a number of repetitions for the mobile terminal's transmission such as PDSCH.

As shown in FIG. 2, the process includes step 202, wherein a network element 200 may transmit transmission configuration information used by the network element to the mobile terminal (e.g, UE 100) for determining transmission parameters, wherein the transmission configuration information comprises a first set of parameters comprising at least a first repetition level set index, a first repetition level index, a first resource allocation and a first transport block size index, or a second set of parameters comprising at least a second repetition level index, a second resource allocation, and a second transport block size index, or a third set of parameters comprising at least a modulation and coding scheme level index, a third resource allocation and a third transport block size index.

In step 202, the transmission configuration information may include one of the three sets of parameters.

In an embodiment, wherein the transmission configuration information comprises the first set of parameters, and the transmission parameters comprise at least a number of repetitions, the number of repetitions may be determined based at least in part on the first repetition level set index and the first repetition level index as described in embodiments in connection with Table.3.

In an embodiment, wherein the transmission configuration information comprises the first set of parameters, one first repetition level set index may correspond to two or more first transport block size indexes as described in embodiments in connection with Table.4.

In an embodiment, wherein the transmission configuration information comprises the first set of parameters, and wherein the transmission parameters comprise at least a transport block size, the transport block size may be determined based at least in part on the first repetition level set index, the first resource allocation and the first transport block size index as described in embodiments in connection with Table.4.

In an embodiment, wherein the transmission configuration information comprises the first set of parameters, a frequency of transmitting the first repetition level set index and the first repetition level index is equal to or lower than a frequency of transmitting the first resource allocation and the first transport block size index. For example, if the network element 200 may expect to use the same number of repetitions for successive several packets and use different TBSes for respective packets, such as TBS=16 for packet 1, TBS=32 for packet 2 and so on, then the network element 200 may transmit the first repetition level set index and the first repetition level index for the successive several packets and transmit respective first resource allocations and respective first transport block size indexes for respective successive several packets.

In an embodiment, wherein the transmission configuration information comprises the second set of parameters, and wherein the transmission parameters comprise at least a second transport block size, the second transport block size may be determined based at least in part on the second resource allocation and the second transport block size index as described in embodiments in connection with Table.8.

In an embodiment, wherein the transmission configuration information comprises the second set of parameters, respective second repetition level set indexes correspond to respective sets of second transport block size indexes which are disjoint from each other as described in embodiments in connection with Table.8.

In an embodiment, wherein the transmission configuration information comprises the second set of parameters, a second repetition level set index is determined based at least in part on the respective sets and the second transport block size index as described in embodiments in connection with Table.8.

In an embodiment, wherein the transmission configuration information comprises the second set of parameters, the transmission parameters comprise at least a number of repetitions which is determined based at least in part on the second repetition level set index and the second repetition level index as described in embodiments in connection with Table.3.

In an embodiment, wherein the transmission configuration information comprises the third set of parameters, a third repetition level set index is determined based at least in part on the modulation and coding scheme level index as described in above embodiments.

In an embodiment, wherein the transmission configuration information comprises the third set of parameters, and the transmission parameters comprise at least a third transport block size, the third transport block size may be determined based at least in part on the third resource allocation and the third transport block size index as described in embodiments in connection with Table.9.

In an embodiment, wherein the transmission configuration information comprises the third set of parameters, and respective repetition level indexes correspond to respective transport block size ranges which are disjoint as described in above embodiments.

In an embodiment, wherein the transmission configuration information comprises the third set of parameters, and a third repetition level index is determined based at least in part on the third transport block size and the respective transport block size ranges as described in above embodiments.

In an embodiment, wherein the transmission configuration information comprises the third set of parameters, and the transmission parameters comprise at least a number of repetitions which is determined based at least in part on the third repetition level set index and the third repetition level index as described in embodiments in connection with Table.3.

According to various embodiments, a bigger transport block size is for a big packet transmission and a smaller transport block size is for a small packet transmission. For example, if an eNB will transmit information including 2064 bits to a UE, the eNB can select a TBS=1032. Using a bigger TBS is beneficial for a big packet transmission, since a full packet can be transmitted using lower number scheduling, which leads to lower control overhead, lower time duration of packet transmission and correspondingly lower power consumption. As another example, if an eNB will transmit information including 32 bits to a UE, the eNB can select a TBS=32. Using smaller a TBS is beneficial for a small packet transmission, since there is no need to add padding bits for the packet transmission, which also reduce the number of repetitions and correspondingly lower power consumption. Comparing with the exiting solution, the present application can provide more TBSes for selection. Thus, it may provide the network element with larger flexibility such that the network element can configure more suitable TBS to maximize system and/or network performance.

According to various embodiments, the network element can transmit the transmission configuration information through at least one of a broadcasting signal, a user equipment specific radio resource control signaling and a physical layer signaling. For example, the network element can transmit the transmission configuration information in DCI.

Figure 3:
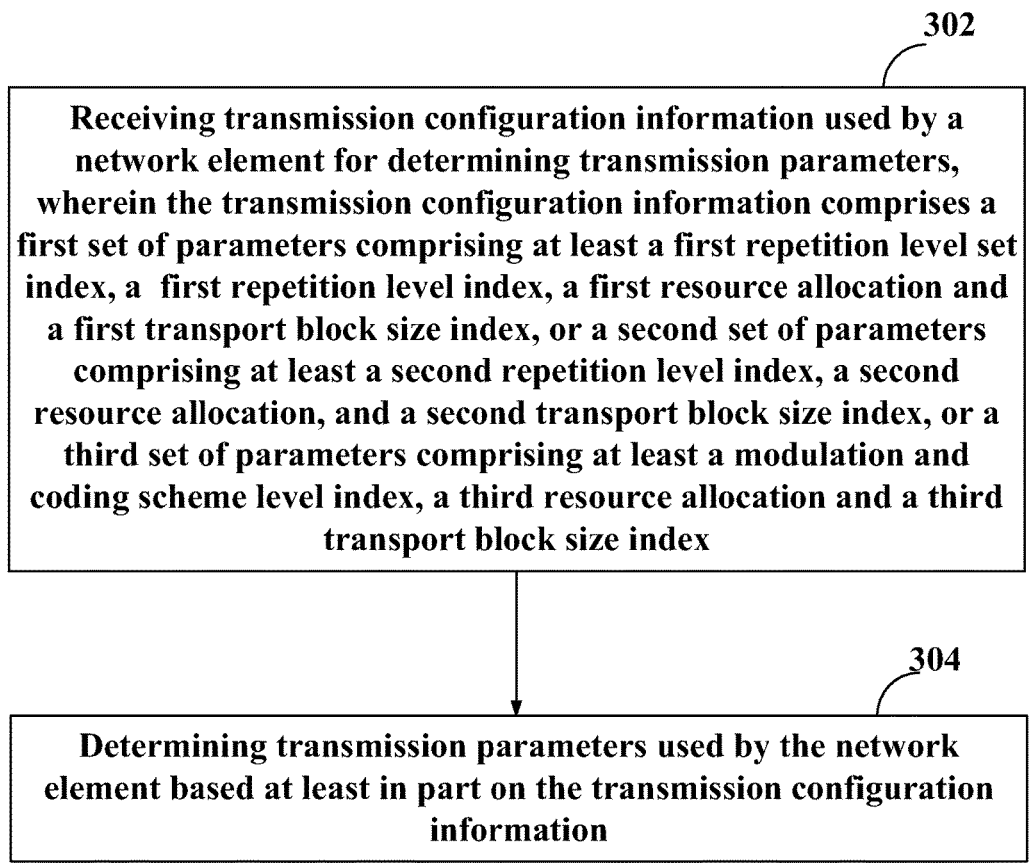
FIG. 3 is a diagram depicting the process of determining transmission parameters according to an embodiment.

FIG. 3 is a diagram depicting the process of receiving transmission configuration information used by a network element for determining transmission parameters, according to an embodiment. This process can be implemented in a mobile terminal 100 or other entity. The transmission parameters may include at least a TBS and/or a number of repetitions for a mobile terminal's transmission such as PDSCH.

As shown in FIG. 3, the process includes step 302, wherein the mobile terminal 100 receives transmission configuration information used by the network element for determining transmission parameters, wherein the transmission configuration information comprises a first set of parameters comprising at least a first repetition level set index, a first repetition level index, a first resource allocation and a first transport block size index, or a second set of parameters comprising at least a second repetition level index, a second resource allocation, and a second transport block size index, or a third set of parameters comprising at least a modulation and coding scheme level index, a third resource allocation and a third transport block size index. In step 302, the transmission configuration information may include one of the three sets of parameters.

The process further includes step 304, wherein the mobile terminal (e.g, UE 100) determines transmission parameters used by the network element based at least in part on the transmission configuration information.

In an embodiment, wherein the transmission configuration information comprises the first set of parameters, and the transmission parameters comprise at least a number of repetitions, the mobile terminal (e.g, UE 100) may determine the number of repetitions for its transmission based at least in part on the first repetition level set index and the first repetition level index as described in embodiments in connection with Table.3.

In an embodiment, wherein the transmission configuration information comprises the first set of parameters, one first repetition level set index may correspond to two or more first transport block size indexes as described in embodiments in connection with Table.4.

In an embodiment, wherein the transmission configuration information comprises the first set of parameters, and wherein the transmission parameters comprise at least a transport block size, the mobile terminal (e.g, UE 100) may determine the transport block size based at least in part on the first repetition level set index, the first resource allocation and the first transport block size index as described in embodiments in connection with Table.4.

In an embodiment, wherein the transmission configuration information comprises the first set of parameters, a frequency of receiving the first repetition level set index and the first repetition level index is equal to or lower than a frequency of receiving the first resource allocation and the first transport block size index. For example, if the network element 200 may expect to use the same number of repetitions for successive several packets and use different TBSes for respective packets, such as TBS=16 for packet 1, TBS=32 for packet 2 and so on, then the network element 200 may transmit the first repetition level set index and the first repetition level index for the successive several packets and transmit respective first resource allocations and respective first transport block size indexes for respective successive several packets. In this case, a frequency of receiving the first repetition level set index and the first repetition level index is equal to or lower than a frequency of receiving the first resource allocation and the first transport block size index.

In an embodiment, wherein the transmission configuration information comprises the second set of parameters, and wherein the transmission parameters comprise at least a second transport block size, the second transport block size may be determined based at least in part on the second resource allocation and the second transport block size index as described in embodiments in connection with Table.8.

In an embodiment, wherein the transmission configuration information comprises the second set of parameters, respective second repetition level set indexes correspond to respective sets of second transport block size indexes which are disjoint from each other as described in embodiments in connection with Table.8.

In an embodiment, wherein the transmission configuration information comprises the second set of parameters, a second repetition level set index is determined based at least in part on the respective sets and the second transport block size index as described in embodiments in connection with Table.8.

In an embodiment, wherein the transmission configuration information comprises the second set of parameters, the transmission parameters comprise at least a number of repetitions which is determined based at least in part on the second repetition level set index and the second repetition level index as described in embodiments in connection with Table.3.

In an embodiment, wherein the transmission configuration information comprises the third set of parameters, a third repetition level set index is determined based at least in part on the modulation and coding scheme level index as described in above embodiments.

In an embodiment, wherein the transmission configuration information comprises the third set of parameters, and the transmission parameters comprise at least a third transport block size, the third transport block size may be determined based at least in part on the third resource allocation and the third transport block size index as described in embodiments in connection with Table.9.

In an embodiment, wherein the transmission configuration information comprises the third set of parameters, and respective repetition level indexes correspond to respective transport block size ranges which are disjoint as described in above embodiments.

In an embodiment, wherein the transmission configuration information comprises the third set of parameters, and a third repetition level index is determined based at least in part on the third transport block size and the respective transport block size ranges as described in above embodiments.

In an embodiment, wherein the transmission configuration information comprises the third set of parameters, and the transmission parameters comprise at least a number of repetitions which is determined based at least in part on the third repetition level set index and the third repetition level index as described in embodiments in connection with Table.3.

According to various embodiments, a bigger transport block size is for a big packet transmission and a smaller transport block size is for a small packet transmission as described in above embodiments.

According to various embodiments, the mobile terminal can receive the transmission configuration information through at least one of a broadcasting signal, a user equipment specific radio resource control signaling and a physical layer signaling. For example, the mobile terminal can receive the transmission configuration information in DCI.

Figure 4:
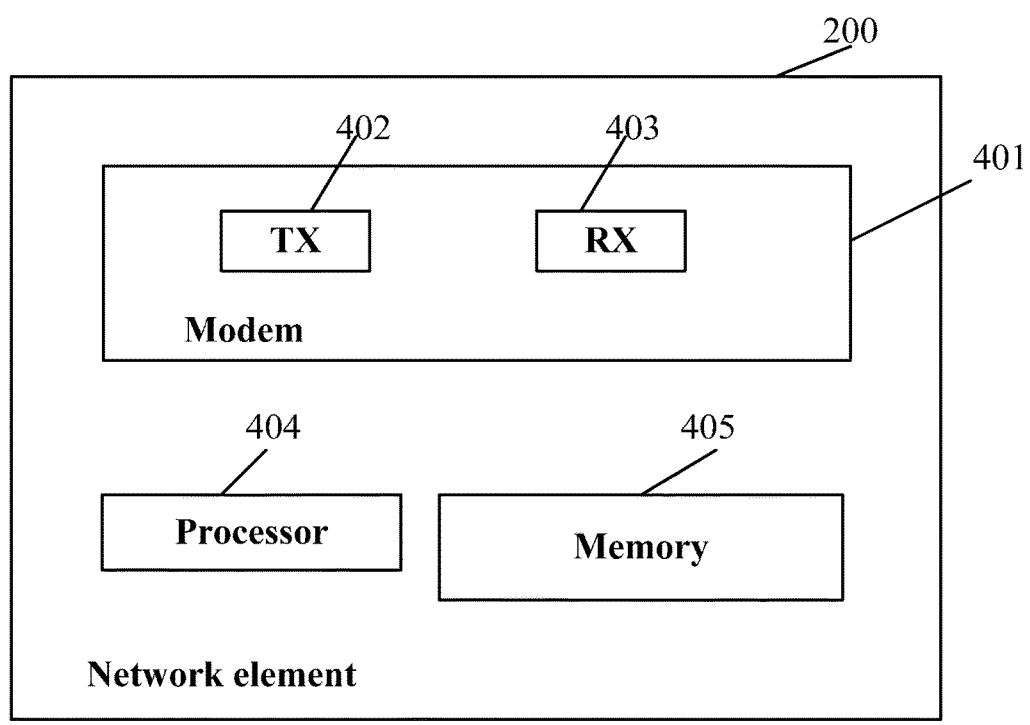
FIG. 4 is a simplified block diagram illustrating an apparatus according to an embodiment.

According to an aspect of the disclosure, it is provided an apparatus such as a network element. FIG. 4 depicts a network element 200 useful in implementing the methods as described above. As shown in FIG. 4, the network element 200 comprises a processing device 404, a memory 405, and a radio modem subsystem 401 in operative communication with the processor 404. The radio modem subsystem 401 comprises at least one transmitter 402 and at least one receiver 403. While only one processor is illustrated in FIG. 4, the processing device 404 may comprises a plurality of processors or multi-core processor(s). Additionally, the processing device 404 may also comprise cache to facilitate processing operations.

Computer-executable instructions can be loaded in the memory 405 and, when executed by the processing device 404, cause the network element 200 to implement the above-described methods in a wireless network. In particular, the computer-executable instructions can cause the network element 200 to transmit transmission configuration information used by the network element 200 to a mobile terminal for determining transmission parameters, wherein the transmission configuration information comprises a first set of parameters comprising at least a first repetition level set index, a first repetition level index, a first resource allocation and a first transport block size index, or a second set of parameters comprising at least a second repetition level index, a second resource allocation, and a second transport block size index, or a third set of parameters comprising at least a modulation and coding scheme level index, a third resource allocation and a third transport block size index.

In an embodiment, wherein the transmission configuration information comprises the first set of parameters, and the transmission parameters comprise at least a number of repetitions, the number of repetitions may be determined based at least in part on the first repetition level set index and the first repetition level index as described in embodiments in connection with Table.3.

In an embodiment, wherein the transmission configuration information comprises the first set of parameters, one first repetition level set index may correspond to two or more first transport block size indexes as described in embodiments in connection with Table.4.

In an embodiment, wherein the transmission configuration information comprises the first set of parameters, and wherein the transmission parameters comprise at least a transport block size, the transport block size may be determined based at least in part on the first repetition level set index, the first resource allocation and the first transport block size index as described in embodiments in connection with Table.4.

In an embodiment, wherein the transmission configuration information comprises the first set of parameters, a frequency of transmitting the first repetition level set index and the first repetition level index is equal to or lower than a frequency of transmitting the first resource allocation and the first transport block size index as described in above embodiments.

In an embodiment, wherein the transmission configuration information comprises the second set of parameters, and wherein the transmission parameters comprise at least a second transport block size, the second transport block size may be determined based at least in part on the second resource allocation and the second transport block size index as described in embodiments in connection with Table.8.

In an embodiment, wherein the transmission configuration information comprises the second set of parameters, respective second repetition level set indexes correspond to respective sets of second transport block size indexes which are disjoint from each other as described in embodiments in connection with Table.8.

In an embodiment, wherein the transmission configuration information comprises the second set of parameters, a second repetition level set index is determined based at least in part on the respective sets and the second transport block size index as described in embodiments in connection with Table.8.

In an embodiment, wherein the transmission configuration information comprises the second set of parameters, the transmission parameters comprise at least a number of repetitions which is determined based at least in part on the second repetition level set index and the second repetition level index as described in embodiments in connection with Table.3.

In an embodiment, wherein the transmission configuration information comprises the third set of parameters, a third repetition level set index is determined based at least in part on the modulation and coding scheme level index as described in above embodiments.

In an embodiment, wherein the transmission configuration information comprises the third set of parameters, and the transmission parameters comprise at least a third transport block size, the third transport block size may be determined based at least in part on the third resource allocation and the third transport block size index as described in embodiments in connection with Table.9.

In an embodiment, wherein the transmission configuration information comprises the third set of parameters, and respective repetition level indexes correspond to respective transport block size ranges which are disjoint as described in above embodiments.

In an embodiment, wherein the transmission configuration information comprises the third set of parameters, and a third repetition level index is determined based at least in part on the third transport block size and the respective transport block size ranges as described in above embodiments.

In an embodiment, wherein the transmission configuration information comprises the third set of parameters, and the transmission parameters comprise at least a number of repetitions which is determined based at least in part on the third repetition level set index and the third repetition level index as described in embodiments in connection with Table.3.

In various embodiments, a bigger transport block size is for a big packet transmission and a smaller transport block size is for a small packet transmission.

In various embodiments, the computer-executable instructions, when executed by the processing device 404, can further cause the network element to transmit the transmission configuration information through at least one of a broadcasting signal, a user equipment specific radio resource control signaling and a physical layer signaling.

According to an aspect of the disclosure it is provided an apparatus such as a network element. The network element comprises: a transmitting means configured to transmit transmission configuration information used by the network element to a mobile terminal for determining transmission parameters, wherein the transmission configuration information comprises a first set of parameters comprising at least a first repetition level set index, a first repetition level index, a first resource allocation and a first transport block size index, or a second set of parameters comprising at least a second repetition level index, a second resource allocation, and a second transport block size index, or a third set of parameters comprising at least a modulation and coding scheme level index, a third resource allocation and a third transport block size index.

In an embodiment, wherein the transmission configuration information comprises the first set of parameters, and the transmission parameters comprise at least a number of repetitions, the number of repetitions may be determined based at least in part on the first repetition level set index and the first repetition level index as described in embodiments in connection with Table.3.

In an embodiment, wherein the transmission configuration information comprises the first set of parameters, one first repetition level set index may correspond to two or more first transport block size indexes as described in embodiments in connection with Table.4.

In an embodiment, wherein the transmission configuration information comprises the first set of parameters, and wherein the transmission parameters comprise at least a transport block size, the transport block size may be determined based at least in part on the first repetition level set index, the first resource allocation and the first transport block size index as described in embodiments in connection with Table.4.

In an embodiment, wherein the transmission configuration information comprises the first set of parameters, a frequency of transmitting the first repetition level set index and the first repetition level index is equal to or lower than a frequency of transmitting the first resource allocation and the first transport block size index as described in above embodiments.

In an embodiment, wherein the transmission configuration information comprises the second set of parameters, and wherein the transmission parameters comprise at least a second transport block size, the second transport block size may be determined based at least in part on the second resource allocation and the second transport block size index as described in embodiments in connection with Table.8.

In an embodiment, wherein the transmission configuration information comprises the second set of parameters, respective second repetition level set indexes correspond to respective sets of second transport block size indexes which are disjoint from each other as described in embodiments in connection with Table.8.

In an embodiment, wherein the transmission configuration information comprises the second set of parameters, a second repetition level set index is determined based at least in part on the respective sets and the second transport block size index as described in embodiments in connection with Table.8.

In an embodiment, wherein the transmission configuration information comprises the second set of parameters, the transmission parameters comprise at least a number of repetitions which is determined based at least in part on the second repetition level set index and the second repetition level index as described in embodiments in connection with Table.3.

In an embodiment, wherein the transmission configuration information comprises the third set of parameters, a third repetition level set index is determined based at least in part on the modulation and coding scheme level index as described in above embodiments.

In an embodiment, wherein the transmission configuration information comprises the third set of parameters, and the transmission parameters comprise at least a third transport block size, the third transport block size may be determined based at least in part on the third resource allocation and the third transport block size index as described in embodiments in connection with Table.9.

In an embodiment, wherein the transmission configuration information comprises the third set of parameters, and respective repetition level indexes correspond to respective transport block size ranges which are disjoint as described in above embodiments.

In an embodiment, wherein the transmission configuration information comprises the third set of parameters, and a third repetition level index is determined based at least in part on the third transport block size and the respective transport block size ranges as described in above embodiments.

In an embodiment, wherein the transmission configuration information comprises the third set of parameters, and the transmission parameters comprise at least a number of repetitions which is determined based at least in part on the third repetition level set index and the third repetition level index as described in embodiments in connection with Table.3.

In various embodiments, a bigger transport block size is for a big packet transmission and a smaller transport block size is for a small packet transmission as described in above embodiments.

In various embodiments, the transmitting means is further configured to transmit the transmission configuration information through at least one of a broadcasting signal, a user equipment specific radio resource control signaling and a physical layer signaling.

Figure 5:
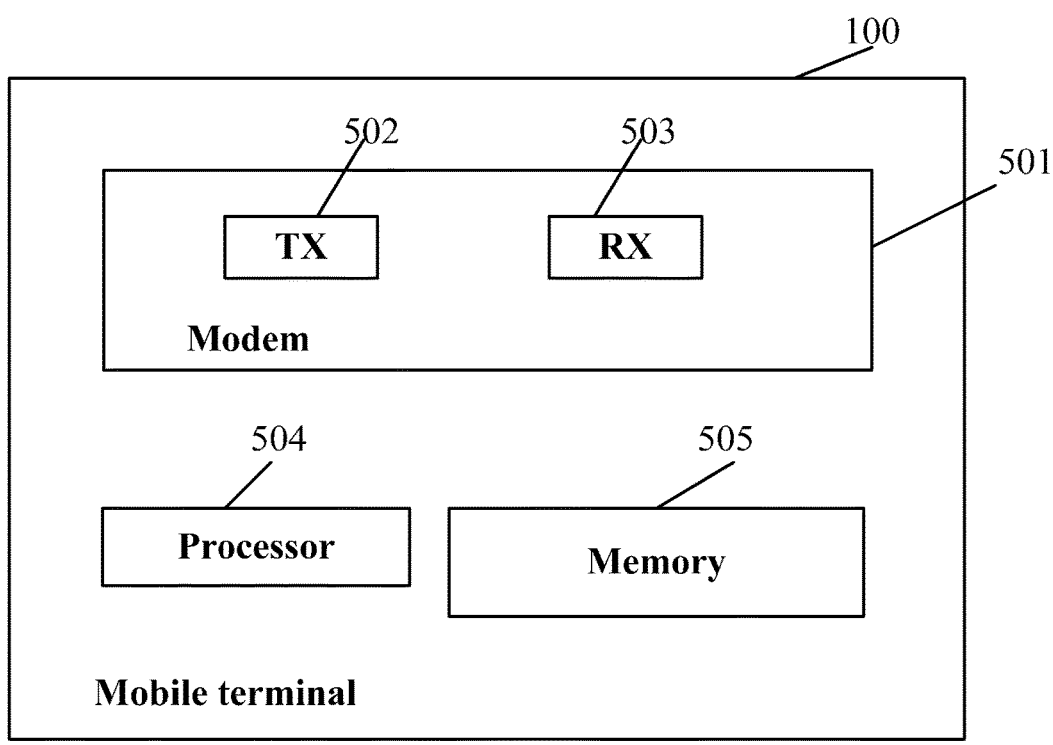
FIG. 5 is a simplified block diagram illustrating an apparatus according to another embodiment.

According to an aspect of the disclosure it is provided an apparatus such as a mobile terminal. FIG. 5 depicts a mobile terminal 100 useful in implementing the methods as described above. As shown in FIG. 5, the mobile element 100 comprises a processing device 504, a memory 505, and a radio modem subsystem 501 in operative communication with the processor 504. The radio modem subsystem 501 comprises at least one transmitter 502 and at least one receiver 503. While only one processor is illustrated in FIG. 5, the processing device 504 may comprises a plurality of processors or multi-core processor(s). Additionally, the processing device 504 may also comprise cache to facilitate processing operations.

Computer-executable instructions can be loaded in the memory 505 and, when executed by the processing device 504, cause the mobile terminal 100 to implement the above-described methods in a wireless network. In particular, the computer-executable instructions can cause the mobile terminal 100 to: receive transmission configuration information used by a network element for determining transmission parameters, wherein the transmission configuration information comprises a first set of parameters comprising at least a first repetition level set index, a first repetition level index, a first resource allocation and a first transport block size index, or a second set of parameters comprising at least a second repetition level index, a second resource allocation, and a second transport block size index, or a third set of parameters comprising at least a modulation and coding scheme level index, a third resource allocation and a third transport block size index; and determine transmission parameters used by the network element based at least in part on the transmission configuration information.

In an embodiment, wherein the transmission configuration information comprises the first set of parameters, and the transmission parameters comprise at least a number of repetitions, the number of repetitions may be determined based at least in part on the first repetition level set index and the first repetition level index as described in embodiments in connection with Table.3.

In an embodiment, wherein the transmission configuration information comprises the first set of parameters, one first repetition level set index may correspond to two or more first transport block size indexes as described in embodiments in connection with Table.4.

In an embodiment, wherein the transmission configuration information comprises the first set of parameters, and wherein the transmission parameters comprise at least a transport block size, the transport block size may be determined based at least in part on the first repetition level set index, the first resource allocation and the first transport block size index as described in embodiments in connection with Table.4.

In an embodiment, wherein the transmission configuration information comprises the first set of parameters, a frequency of receiving the first repetition level set index and the first repetition level index is equal to or lower than a frequency of receiving the first resource allocation and the first transport block size index.

In an embodiment, wherein the transmission configuration information comprises the second set of parameters, and wherein the transmission parameters comprise at least a second transport block size, the second transport block size may be determined based at least in part on the second resource allocation and the second transport block size index as described in embodiments in connection with Table.8.

In an embodiment, wherein the transmission configuration information comprises the second set of parameters, respective second repetition level set indexes correspond to respective sets of second transport block size indexes which are disjoint from each other as described in embodiments in connection with Table.8.

In an embodiment, wherein the transmission configuration information comprises the second set of parameters, a second repetition level set index is determined based at least in part on the respective sets and the second transport block size index as described in embodiments in connection with Table.8.

In an embodiment, wherein the transmission configuration information comprises the second set of parameters, the transmission parameters comprise at least a number of repetitions which is determined based at least in part on the second repetition level set index and the second repetition level index as described in embodiments in connection with Table.3.

In an embodiment, wherein the transmission configuration information comprises the third set of parameters, a third repetition level set index is determined based at least in part on the modulation and coding scheme level index as described in above embodiments.

In an embodiment, wherein the transmission configuration information comprises the third set of parameters, and the transmission parameters comprise at least a third transport block size, the third transport block size may be determined based at least in part on the third resource allocation and the third transport block size index as described in embodiments in connection with Table.9.

In an embodiment, wherein the transmission configuration information comprises the third set of parameters, and respective repetition level indexes correspond to respective transport block size ranges which are disjoint as described in above embodiments.

In an embodiment, wherein the transmission configuration information comprises the third set of parameters, and a third repetition level index is determined based at least in part on the third transport block size and the respective transport block size ranges as described in above embodiments.

In an embodiment, wherein the transmission configuration information comprises the third set of parameters, and the transmission parameters comprise at least a number of repetitions which is determined based at least in part on the third repetition level set index and the third repetition level index as described in embodiments in connection with Table.3.

According to various embodiments, a bigger transport block size is for a big packet transmission and a smaller transport block size is for a small packet transmission as described in above embodiments.

According to various embodiments, the computer-executable instructions, when executed by the processing device 504, can further cause the mobile terminal 100 to: receive the transmission configuration information through at least one of a broadcasting signal, a user equipment specific radio resource control signaling and a physical layer signaling. For example, the mobile terminal can receive the transmission configuration information in DCI.

According to an aspect of the disclosure it is provided an apparatus. The apparatus comprises: a receiving means configured to receive transmission configuration information used by a network element for determining transmission parameters, wherein the transmission configuration information comprises a first set of parameters comprising at least a first repetition level set index, a first repetition level index, a first resource allocation and a first transport block size index, or a second set of parameters comprising at least a second repetition level index, a second resource allocation, and a second transport block size index, or a third set of parameters comprising at least a modulation and coding scheme level index, a third resource allocation and a third transport block size index; and a determining means configured to determine transmission parameters used by the network element based at least in part on the transmission configuration information.

In an embodiment, wherein the transmission configuration information comprises the first set of parameters, and the transmission parameters comprise at least a number of repetitions, the determining means may be further configured to determine the number of repetitions for its transmission based at least in part on the first repetition level set index and the first repetition level index as described in embodiments in connection with Table.3.

In an embodiment, wherein the transmission configuration information comprises the first set of parameters, one first repetition level set index may correspond to two or more first transport block size indexes as described in embodiments in connection with Table.4.

In an embodiment, wherein the transmission configuration information comprises the first set of parameters, and wherein the transmission parameters comprise at least a transport block size, the determining means may be further configured to determine the transport block size based at least in part on the first repetition level set index, the first resource allocation and the first transport block size index as described in embodiments in connection with Table.4.

In an embodiment, wherein the transmission configuration information comprises the first set of parameters, a frequency of receiving the first repetition level set index and the first repetition level index is equal to or lower than a frequency of receiving the first resource allocation and the first transport block size index.

In an embodiment, wherein the transmission configuration information comprises the second set of parameters, and wherein the transmission parameters comprise at least a second transport block size, the second transport block size may be determined based at least in part on the second resource allocation and the second transport block size index as described in embodiments in connection with Table.8.

In an embodiment, wherein the transmission configuration information comprises the second set of parameters, respective second repetition level set indexes correspond to respective sets of second transport block size indexes which are disjoint from each other as described in embodiments in connection with Table.8.

In an embodiment, wherein the transmission configuration information comprises the second set of parameters, a second repetition level set index is determined based at least in part on the respective sets and the second transport block size index as described in embodiments in connection with Table.8.

In an embodiment, wherein the transmission configuration information comprises the second set of parameters, the transmission parameters comprise at least a number of repetitions which is determined based at least in part on the second repetition level set index and the second repetition level index as described in embodiments in connection with Table.3.

In an embodiment, wherein the transmission configuration information comprises the third set of parameters, a third repetition level set index is determined based at least in part on the modulation and coding scheme level index as described in above embodiments.

In an embodiment, wherein the transmission configuration information comprises the third set of parameters, and the transmission parameters comprise at least a third transport block size, the third transport block size may be determined based at least in part on the third resource allocation and the third transport block size index as described in embodiments in connection with Table.9.

In an embodiment, wherein the transmission configuration information comprises the third set of parameters, and respective repetition level indexes correspond to respective transport block size ranges which are disjoint as described in above embodiments.

In an embodiment, wherein the transmission configuration information comprises the third set of parameters, and a third repetition level index is determined based at least in part on the third transport block size and the respective transport block size ranges as described in above embodiments.

In an embodiment, wherein the transmission configuration information comprises the third set of parameters, and the transmission parameters comprise at least a number of repetitions which is determined based at least in part on the third repetition level set index and the third repetition level index as described in embodiments in connection with Table.3.

In various embodiments, a bigger transport block size is for a big packet transmission and a smaller transport block size is for a small packet transmission as described in above embodiments.

In various embodiments, the receiving means is further configured to receive the transmission configuration information through at least one of a broadcasting signal, a user equipment specific radio resource control signaling and a physical layer signaling. For example, the mobile terminal can receive the transmission configuration information in DCI.

According to an aspect of the disclosure it is provided a computer program product comprising at least one non-transitory computer-readable storage medium having computer-executable program instructions stored therein, the computer-executable instructions being configured to, when being executed, cause an apparatus such as a network element to operate as described above.

According to an aspect of the disclosure it is provided a computer program product comprising at least one non-transitory computer-readable storage medium having computer-executable program instructions stored therein, the computer-executable instructions being configured to, when being executed, cause an apparatus such as a mobile terminal to operate as described above.

It is noted that any of the components of the network element and mobile element can be implemented as hardware or software modules. In the case of software modules, they can be embodied on a tangible computer-readable recordable storage medium. All of the software modules (or any subset thereof) can be on the same medium, or each can be on a different medium, for example. The software modules can run, for example, on a hardware processor. The method steps can then be carried out using the distinct software modules, as described above, executing on a hardware processor.

The terms "computer program", "software" and "computer program code" are meant to include any sequences or human or machine cognizable steps which perform a function. Such program may be rendered in virtually any programming language or environment including, for example, C/C++, Fortran, COBOL, PASCAL, assembly language, markup languages (e.g., HTML, SGML, XML), and the like, as well as object-oriented environments such as the Common Object Request Broker Architecture (CORBA), Java™ (including J2ME, Java Beans, etc.), Binary Runtime Environment (BREW), and the like.

The terms "memory" and "storage device" are meant to include, but not limited to, an electronic, magnetic, optical, electromagnetic, infrared, or semiconductor system, apparatus, or device, or any suitable combination of the foregoing. More specific examples (a non-exhaustive list) of the memory or storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the disclosure provided herein, one of ordinary skill in the related art will be able to contemplate other implementations of the components of the disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. A method, comprising:
transmitting transmission configuration information used by a network element to a mobile terminal for determining transmission parameters, wherein the transmission configuration information comprises
a first set of parameters comprising at least a first repetition level set index, a first repetition level index, a first resource allocation and a first transport block size index, or
a second set of parameters comprising at least a second repetition level index, a second resource allocation, and a second transport block size index, or
a third set of parameters comprising at least a modulation and coding scheme level index, a third resource allocation and a third transport block size index.

2. The method according to claim 1, wherein the transmission configuration information comprises the first set of parameters, and the transmission parameters comprise at least a number of repetitions which is determined based at least in part on the first repetition level set index and the first repetition level index.

3. An apparatus, comprising:
at least one processor; and
at least one memory including computer program code,
wherein the at least one memory and the computer program code are configured to, with the at least one processor, cause the apparatus to
transmit transmission configuration information used by the apparatus to a mobile terminal for determining transmission parameters, wherein the transmission configuration information comprises
a first set of parameters comprising at least a first repetition level set index, a first repetition level index, a first resource allocation and a first transport block size index, or
a second set of parameters comprising at least a second repetition level index, a second resource allocation, and a second transport block size index, or
a third set of parameters comprising at least a modulation and coding scheme level index, a third resource allocation and a third transport block size index.

4. The apparatus according to claim 3, wherein the transmission configuration information comprises the first set of parameters, and the transmission parameters comprise at least a number of repetitions which is determined based at least in part on the first repetition level set index and the first repetition level index.

5. The apparatus according to claim 3, wherein the transmission configuration information comprises the first set of parameters, and one first repetition level set index corresponds to two or more first transport block size indexes.

6. The apparatus according to claim 3, wherein the transmission configuration information comprises the first set of parameters, and the transmission parameters comprise at least a transport block size which is determined based at least in part on the first repetition level set index, the first resource allocation and the first transport block size index.

7. The apparatus according to claim 3, wherein the transmission configuration information comprises the first set of parameters, and a frequency of transmitting the first repetition level set index and the first repetition level index is equal to or lower than a frequency of transmitting the first resource allocation and the first transport block size index.

8. The apparatus according to claim 3, wherein the transmission configuration information comprises the second set of parameters, and wherein the transmission parameters comprise at least a second transport block size which is determined based at least in part on the second resource allocation and the second transport block size index.

9. The apparatus according to claim 8, wherein the transmission configuration information comprises the second set of parameters, and respective second repetition level set indexes correspond to respective sets of second transport block size indexes which are disjoint from each other.

10. The apparatus according to claim 9, wherein the transmission configuration information comprises the second set of parameters, and a second repetition level set index is determined based at least in part on the respective sets and the second transport block size index.

11. The apparatus according to claim 10, wherein the transmission configuration information comprises the second set of parameters, and the transmission parameters comprise at least a number of repetitions which is determined based at least in part on the second repetition level set index and the second repetition level index.

12. The apparatus according to claim 3, wherein the transmission configuration information comprises the third set of parameters, and a third repetition level set index is determined based at least in part on the modulation and coding scheme level index.

13. The apparatus according to claim 3, wherein the transmission configuration information comprises the third set of parameters, and the transmission parameters comprise at least a third transport block size which is determined based at least in part on the third resource allocation and the third transport block size index.

14. The apparatus according to claim 13, wherein the transmission configuration information comprises the third set of parameters, and respective repetition level indexes correspond to respective transport block size ranges which are disjoint.

15. The apparatus according to claim 14, wherein the transmission configuration information comprises the third set of parameters, and a third repetition level index is determined based at least in part on the third transport block size and the respective transport block size ranges.

16. The apparatus according to claim 15, wherein the transmission configuration information comprises the third set of parameters, and the transmission parameters comprise at least a number of repetitions which is determined based at least in part on the third repetition level set index and the third repetition level index.

17. The apparatus according to claim 3, wherein a bigger transport block size is for a big packet transmission and a smaller transport block size is for a small packet transmission.

18. The apparatus according to claim 3, wherein the at least one memory and the computer program code are further configured to, with the at least one processor, cause the apparatus to transmit the transmission configuration information through at least one of a broadcasting signal, a user equipment specific radio resource control signaling and a physical layer signaling.

19. An apparatus, comprising:
at least one processor; and
at least one memory including computer program code,
wherein the at least one memory and the computer program code are configured to, with the at least one processor, cause the apparatus to:
receive transmission configuration information used by a network element for determining transmission parameters, wherein the transmission configuration information comprises
a first set of parameters comprising at least a first repetition level set index, a first repetition level index, a first resource allocation and a first transport block size index, or
a second set of parameters comprising at least a second repetition level index, a second resource allocation, and a second transport block size index, or
a third set of parameters comprising at least a modulation and coding scheme level index, a third resource allocation and a third transport block size index; and
determine transmission parameters used by the network element based at least in part on the transmission configuration information.

20. The apparatus according to claim 19, wherein the transmission configuration information comprises the first set of parameters, and the transmission parameters comprise at least a number of repetitions which is determined based at least in part on the first repetition level set index and the first repetition level index.

* * * * *